United States Patent
Bortolini et al.

[19]

[11] Patent Number: 6,005,902
[45] Date of Patent: Dec. 21, 1999

[54] PROVIDING TIMING TO AN EXTERNAL SYSTEM

[75] Inventors: James R. Bortolini, Broomfield; Stefano Mimmi, Westminster, both of Colo.

[73] Assignee: Lucent Technologies Inc., Murray Hill, N.J.

[21] Appl. No.: 08/921,676

[22] Filed: Aug. 29, 1997

[51] Int. Cl.⁶ .................. H04L 7/00; H04J 3/06; H04B 10/00
[52] U.S. Cl. .................. 375/356; 375/354; 375/357; 375/358; 370/503; 370/507; 359/118; 359/115; 359/135; 359/158; 395/551
[58] Field of Search .................. 375/354, 356, 375/357, 358; 370/503, 507; 359/118, 115, 135, 158; 395/551

[56] References Cited

U.S. PATENT DOCUMENTS

| | | | |
|---|---|---|---|
| 3,869,579 | 3/1975 | Otto | 179/15 |
| 4,633,193 | 12/1986 | Scordo | 331/1 A |
| 4,724,435 | 2/1988 | Moses et al. | 340/370.13 |
| 5,023,572 | 6/1991 | Caldwell et al. | 331/10 |
| 5,053,942 | 10/1991 | Srini | 395/311 |
| 5,212,578 | 5/1993 | Grimes et al. | 359/124 |
| 5,327,402 | 7/1994 | Shinomiya | 368/46 |
| 5,347,227 | 9/1994 | Bortolini | 328/63 |
| 5,373,537 | 12/1994 | Oberhauser et al. | 375/108 |
| 5,416,772 | 5/1995 | Helton et al. | 370/66 |
| 5,483,201 | 1/1996 | Bortolini | 331/1 A |
| 5,682,408 | 10/1997 | Tanonaka | 375/354 |
| 5,832,303 | 11/1998 | Murase et al. | 395/856 |
| 5,838,249 | 11/1998 | Saito et al. | 340/825.06 |

FOREIGN PATENT DOCUMENTS 0522748  6/1992  European Pat. Off. .......... H04J 3/06

*Primary Examiner*—Stephen Chin
*Assistant Examiner*—Michael W. Maddox
*Attorney, Agent, or Firm*—John C. Moran

[57] ABSTRACT

Synchronizing a local timing unit to a central timing unit in a first switching system to determine the difference in timing between a connected external link and the local timing unit. This timing difference is then transmitted to the central timing unit which utilizes this information to adjust a frequency synthesizer that outputs the frequency of the external link to a second switching system. The local timing units are synchronized to the central timing unit via multiple timing paths set up through switching units within a switching network of the first switching system. The timing difference transmitted from the local timing unit is transmitted over a plurality of control paths through the switching units. Each switching unit switches one bit of data for each group of data being received on each of the external links connected to the first switching system. Any of the external links connected to the first switching system can be utilized to provide timing information for the second switching system.

24 Claims, 13 Drawing Sheets

PROVIDING TIMING TO AN EXTERNAL SYSTEM

CROSS-REFERENCE TO RELATED APPLICATIONS

E. J. Bortolini, U.S. patent application Ser. No. 08/921,675, "Bit Sliced Digital Cross Connect Switching System";

E. J. Bortolini, U.S. patent application Ser. No. 08/922,271, "Bit Sliced Digital Cross Connect Switching System Controlled by Port Units";

J. R. Bortolini, U.S. patent application Ser. No. 08/921,673, "Switching Network Providing Multiple Timing Paths for Port Circuits"; and J. R. Bortolini, U.S. patent application Ser. No. 08/921,677, "Synchronizing a Central Timing Unit to an External Link Via a Switching Network".

These applications are filed concurrently with this application and are assigned to the same assignee.

TECHNICAL FIELD

This invention relates to communication switching, and in particular, to provision of timing to an external communication system.

BACKGROUND OF THE INVENTION

Within the telecommunication switching field, it is not uncommon to have two switching systems physically located together and to have a first switching system being synchronized to one of a set of external links that terminate on the second switching system. In the prior art, this has been accomplished by hard wiring each of the set of external links to a central timing unit of the second system. Normally, the central timing unit would use another one of the set of external links to generate the internal timing for the second system. The central timing unit needed a first synchronizer to generate the internal timing and a second synchronizer to generate the timing for the first system. Both synchronizers had to have the capability of selecting any of the set of the external links. In addition, a separate internal physical link had to be connected from each port circuit terminating each of the set links to the central timing unit. Since any external link could be included in the set of external links, each port circuit had to have a physical jack to allow the connection of the port circuit to the central timing unit. In a large system in which the port circuits where distributed over a large area, it was difficult to maintain good transmission characteristics on the internal links over large distances. Also, it was difficult to perform software maintenance operations on the individual internal links.

SUMMARY OF THE INVENTION

The foregoing problems are solved, and a technical advance is achieved by an apparatus and method in which a local timing unit synchronized to a centralized timing unit determines the difference in timing between a connected external link and the local timing unit. This timing difference is then transmitted to the central timing unit which utilizes this information to adjust a frequency synthesizer that outputs the frequency of the external link to a second switching system. Advantageously, the local timing units are synchronized to the central timing unit via multiple timing paths set up through switching units within a switching network of the first switching system. The timing difference transmitted from the local timing unit is transmitted over a plurality of control paths through the switching units. Each switching unit switches one bit of data for each group of data being received on each of the external links connected to the first switching system. Any of the external links connected to the first switching system can be utilized to provide timing information for the second switching system.

Other and further aspects of the present invention will become apparent during the course of the following description by reference to the accompanying drawing.

DETAILED DESCRIPTION

Figure 1:
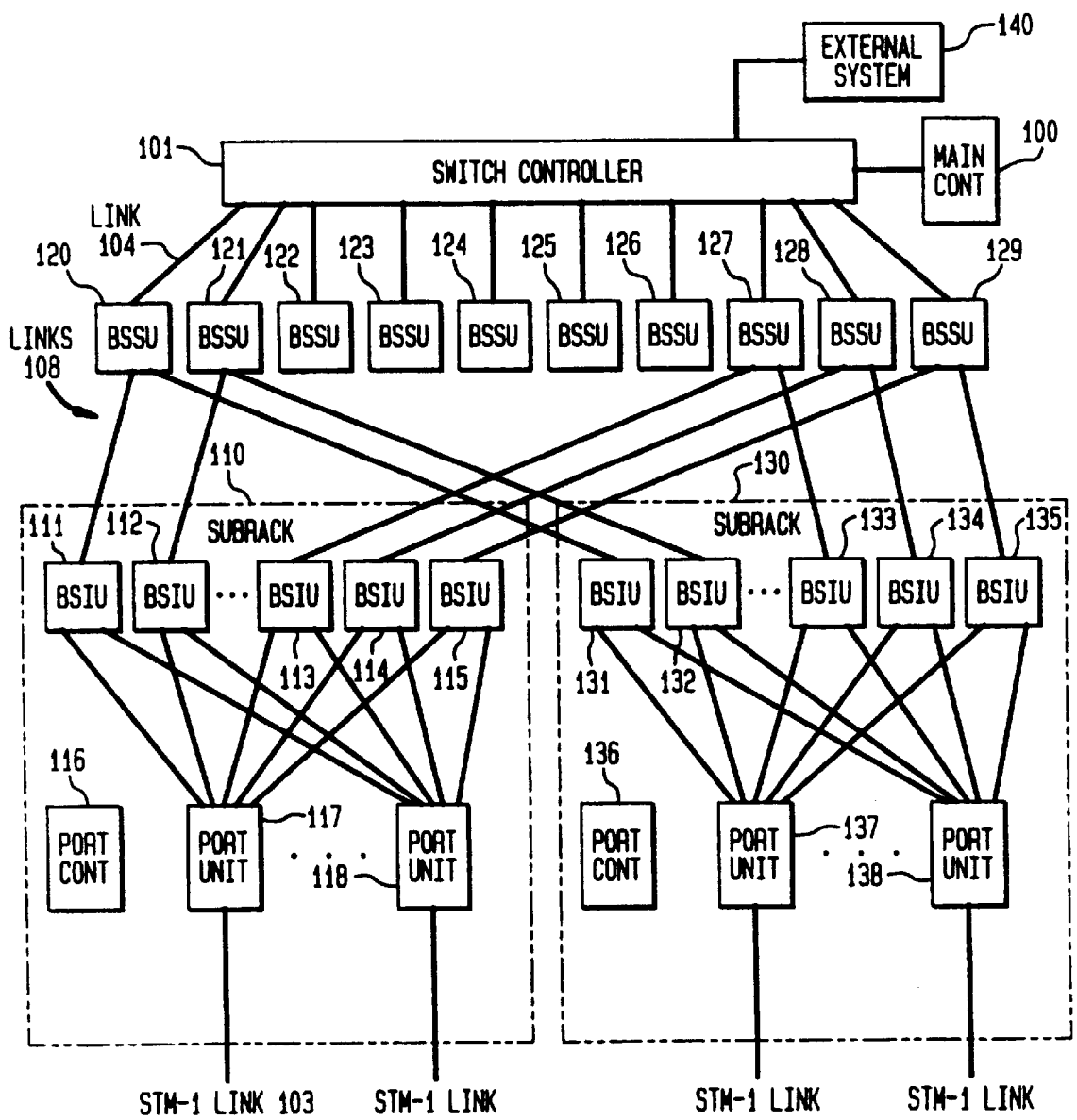
FIG. 1 illustrates, in block diagram form, a telecommunication switching system in accordance with the invention.

FIG. 1 illustrates, in block diagram form, a telecommunication switching system in accordance with the invention. Switch controller 101 in response to information received from main controller 100 controls the overall operation of the switching system illustrated in FIG. 1. The switching of data is performed by bit sliced switching units (BSSUs) 120–129. There are illustratively 10 BSSUs. Each active BSSU switches one bit of each byte of each of the external links such as link 103 connected to the switching system of FIG. 1. Advantageously, link 103 and the other external links are STM-1 links. Bilateral optical fiber links such as link 108, consist of one optical fiber capable of communicating one bit of data from each of 32 STM-1 links between BSSUs and bit sliced interface (BSIUs) units. Since each BSSU has eight inputs, BSSUs 120–129 are capable of handling 256 STM-1 links terminating on the switching system illustrated in FIG. 1. At any given time, only eight of the BSSUs 120–129 are in use. As will be explained with respect to BSIUs 111–135, only eight of the BSSUs are receiving data to be switched at any one time. Each BSSU is a self-contained switching system that includes a full timeslot exchanger and all required control memories to perform switching functions as set forth for a full eight bit switching unit in U.S. Pat. No. 5,416,772 which is hereby incorporated by reference. In addition, each BSSU has associated with it one BSIU from each of the subracks. Each BSSU, associated BSIUs, and interconnecting optical fiber links are termed a switching group. As will be described in later paragraphs, the port controllers, such as port controller 116, determine which bit from the STM-1 links is to be transmitted to an individual BSSU based on control information received from switch controller 101. Advantageously, a full timeslot interchanger gives the switching system of FIG. 1 the capability of doing full broadcast switching. One skilled in the art could readily envision that other types of switches could be used in place of a timeslot interchanger. In full broadcast switching, information received on an external link, such as link 103, can be switched simultaneously to all outgoing communication paths on the other external links. Greater detail on how a full time slot interchanger is implemented in each BSSU is given in the section which details BSSU 120. Advantageously, such full timeslot interchanging is economically feasible by each BSSU switching only one bit from each of the connected STM-1 links.

In addition to providing control, switching controller 101 provides all timing information for the system illustrated in FIG. 1. In addition, switch controller 101 provides a timing signal for external system 140 synchronized to one of the STM-1 links illustrated in FIG. 1. Each port controller such as port controller 116 receives timing information via each of the bit slice paths established through each pair of BSSU and BSIU such as BSSU 120 and BSIU 111. Because of the method of synchronizing the port controllers to switch controller 101, each port controller is in excellent synchronization with a central timing unit in switch controller 101. The port units receive their timing information from the local timing unit in the port controller. In order to synchronize external system 140 to an external link, each port unit determines the difference in timing between the timing received from the local timing unit and that of the connected STM-1 link. This difference information, which is the difference in phase, is then transmitted to the central timing unit. The central timing unit selects from the plurality of difference information being transmitted by the different port units and utilizes the information associated with the STM-1 link to which the external system 140 is to be synchronized. The central timing unit uses the information to control a digital synthesizer to generate the timing signal for external system 140 that is synchronized to the selected STM-1.

Consider now a BSIU, such as BSIU 111, of subrack 110 of FIG. 1. BSIU 111 interconnects a bilateral optical fiber of link 108 with BSSU 120. Similarly, BSIU 112 is interconnected by a bilateral optical fiber with BSSU 121. BSIU 111 only communicates with BSSU 120. Note, that each of the two optical fibers for BSIUs 111 and 112 is carrying a different bit from each of the 32 STM-1 links connected to subrack 110. Subrack 110 has illustratively 32 port units each advantageously terminating 1 STM-1 links resulting in 32 STM-1 links per subrack. One skilled in the art could readily envision a port unit terminating more than one STM-1 link. Each port unit transmits data on 1 transmit electrical link to each BSIU and receives data on 1 receive electrical link from each BSIU. There is one pair of electrical links for each STM-1 link. For example, port unit 117 has a transmit and receive link to each of BSIUs 111–115. The result is that there are 320 electrical links in each direction interconnecting the port units to the 10 BSIUs of subrack 110. Internally, each port unit can transmit any bit of each byte of a received STM-1 bit stream on any of the transmit electrical links connecting to the BSIUs. The electrical links are independent of each other. This allows a port unit to distribute any individual bit to any of the 10 BSIUs. BSIU 111 is responsive to the bit stream being received from each port unit to combine and output these bit streams over optical fiber link 108 to BSSU 120. Since the port units are capable of transmitting any bit of the incoming bytes to BSIU 111, BSSU 120 can be switching any of the eight data bits of the incoming STM-1 links. Note, that all port units have to be sending the same bit position of the incoming bytes to BSSU 120. This is necessary since BSSU 120 returns this bit back to the port units after switching the information so that the port units can transmit this information out on the interconnecting STM-1 links. The bits selected by the port units of subrack 110 to be sent or received to or from a particular BSIU is controlled by port controller 116 based on information received from switch controller 101.

Since the port units can switch any bit of the bytes to any of the BSSUs, if BSSU 120 fails, the bit that had been switched by BSSU 120 can now be transferred to BSSU 129 or 128 (if these BSSUs were inactive). BSSU 120–129 and their associated BSIUs (switching groups) are electrically and optically isolated from each other; hence, the switching system of FIG. 1 must suffer failures in three switching groups before the system can no longer perform the switching of incoming bytes on the STM-1 links. Further, since each BSIU switches only one bit and there are ten BSIUs, three BSIUs of a given subrack must fail before the subrack can no longer switch information. Note, that the other subracks would still remain active. The only unit of the switching system illustrated in FIG. 1 whose failure can disable communication is a port unit and failure of a port unit results in only one STM-1 link being unable to communicate through the switching system illustrated in FIG. 1. One skilled in the art could readily envision the use of a spare port unit to further increase reliability.

In prior art systems, another source of system failure was the failure to be able to communicate control information. Within the switching system of FIG. 1, switch controller 101 communicates control information to BSSUs 120–129 via bilateral optical fiber links such as link 104. Each BSSU communicates control information along with switched data to and from the connected BSIUs. Each BSIU communicates the control information to the port controller within the subrack. Port controller 116 communicates control information via BSIUs 111–115. Port controller 116 transmits received control information to port units 117–118. Because there are ten paths over which control information can be communicated with switch controller 101, a port controller is always guaranteed to have a valid control communication path. Note, since each BSSU receives control information concerning its operation through its own optical fiber link from switch controller 101, the failure of such an optical fiber only disables a single BSSU.

In addition to control information being communicated over each of the optical fibers interconnecting switch controller 101 to BSSUs 120–129, timing information is also communicated in this manner; thereby, assuring that each BSSU receives its timing separate from other BSSUs. In addition, each port controller utilizes timing information received on all of the optical fiber links, such as link 108, from each BSSU via the interconnecting BSIU and utilizes this timing information to assure that the timing within the subrack conforms to the timing of switch controller 101. Hence, each port controller has multiple paths over which timing information can be received.

Figure 2:
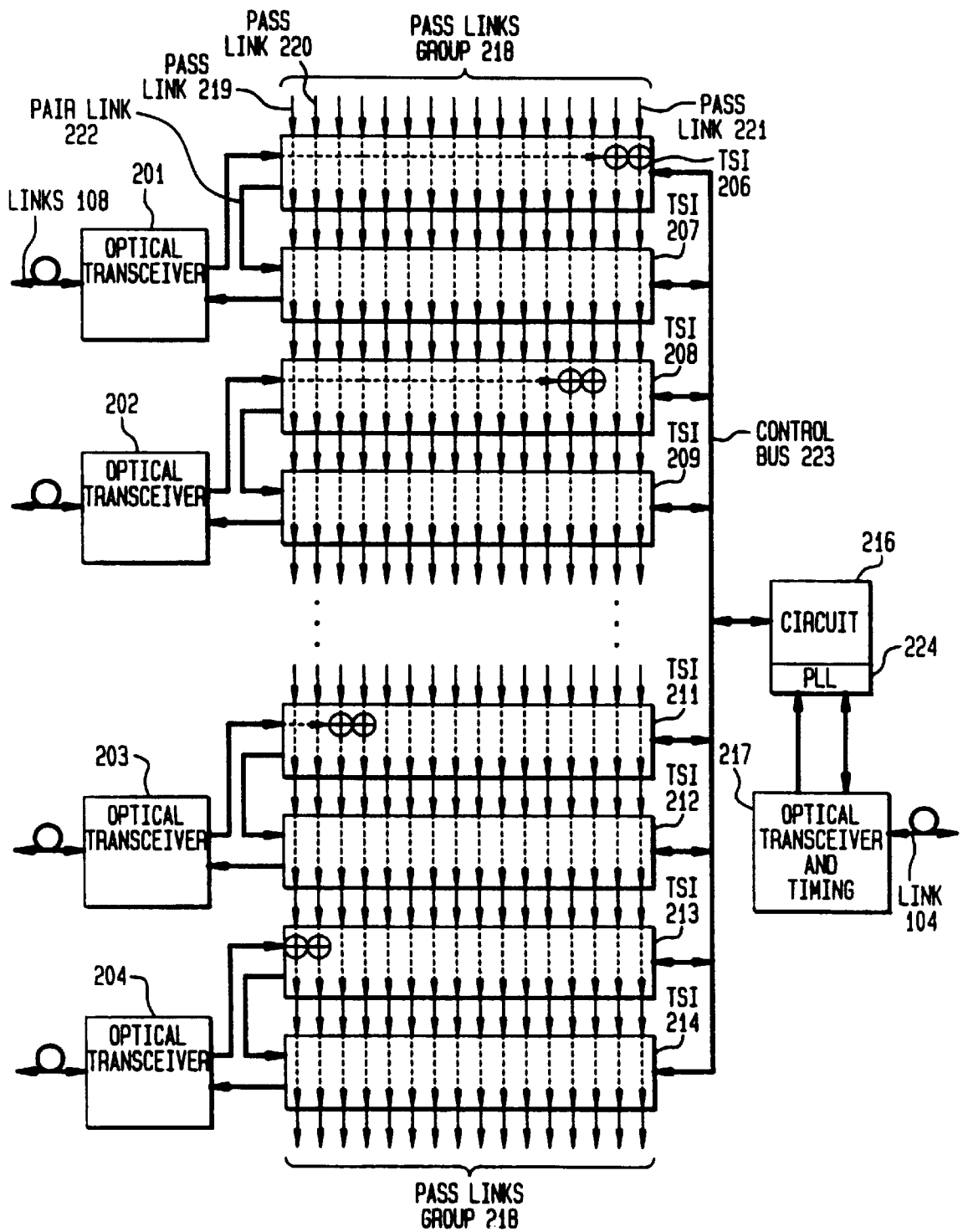
FIG. 2 illustrates, in block diagram form, a bit slice switching unit.

FIG. 2 illustrates in greater detail BSSU 120. Each STM-1 link is communicating data as SDH frames, and each SDH frame has nine rows of data. BSSUs 120–129 switch data a row at a time. One skilled in the art could readily envision switching a partial row at a time. BSSU 120 performs full SDH switching for one bit stream (also referred to as a bit position) of the bytes for each of STM-1 links illustrated on FIG. 1. The connections of BSSU 120 to the BSIUs of the subracks is via bilateral optical fibers that terminate on optical transceivers 201–204. For example, optical transceiver 201 connects to optical fiber link 108 from BSIU 111 of subrack 110. Each of the optical fiber links from a BSIU is transporting one bit stream of data for the 32 STM-1 links connected to a subrack. Each row of data contains one bit from each STM-1 link. Within a subrack such as subrack 110, port unit 117 transmits to BSIU 111 one bit of a row from the connected STM-1 link. Each subrack has a total of 32 port units. BSIU 111 is responsive to the bits for each of the 32 STM-1 links to form these bits into a single bit stream which is transmitted on link 108 to BSSU 120.

Control and timing information is communicated by BSSU 120 with switch controller 101 via optical fiber link 104 which is terminated by optical transceiver and timing circuit 217. Circuit 217 communicates the control information on control bus 223.

The switching of data being received from the subracks via optical transceivers 201–204 is performed by TSIs 206–214. There are 16 TSIs in each BSSU, and this allows the BSSUs to provide full broadcast switching. The TSIs are grouped into pairs such as TSIs 206 and 207. Note, that TSIs 208 and 209, TSIs 211 and 212, and TSIs 213 and 214 also form pairs of TSIs. Within a TSI pair, one type of TSI receives data from the optical fiber link and the other type of TSI transmits data on the optical fiber link. Within a TSI pair, each TSI performs the switching of data to the interconnecting optical fiber link. For simplification of nomenclature, these two types of TSIs are referred to as a transmit TSI and a receive TSI. Each pair of TSIs has access to all of the bits being received by other pairs of TSIs. This is accomplished by the utilization of pass links between TSIs which allows the circulation of received data bits from the eight optical fiber links interconnecting BSSU 120 to the subracks 110–130. Pass links group 218 comprises 16 pass links, pass links 219–221. Each pass link comprises four bits. Each TSI pair transmits data received from its interconnected optical fiber link on two pass links. For example, TSI 206 transmits on pass links 219 and 220 the received data from optical transceiver 201. TSIs 206 and 207 receive data associated with the other optical fibers terminated on optical transceivers 202–204 on the remaining 14 pass links of pass links group 218. As will be described with respect to FIG. 3, the receiving TSI of the TSI pair forms the incoming data from the optical transceiver into eight bit data streams. For example, TSI 206 is responsive to the data being received from optical transceiver 201 to form this into eight data bit streams which are transmitted on pass links 219 and 220 by TSI 206. Each stream of these eight data bit streams contain data from four STM-1 links. TSI 206 receives these eight bits of each data bit stream back again after they have passed through TSIs 207 through 214. TSI 206 does not continue to circulate the data bit streams.

Each TSI extracts four data bit streams from all incoming data bit streams to BSSU 120. The receiving TSI transfers the results of its extracting to the transmitting TSI. Each TSI performs full SDH switching on each data bit stream with each data bit stream containing data for four STM-1 links. For example, TSI 206 transfers the bits which it has switched from the incoming data bits to TSI 207 via pair link 222. TSI 207 is responsive to the four bits being received on pair link 222 and the four bits that it has switched for each clock cycle to form these bits into a single data bit stream that is then transferred to optical transceiver 201. The latter transceiver transmits this data bit stream on link 108.

PLL 224 provides the necessary timing of the incoming information on optical fiber link 104 and generates the internal timing of BSSU 120. Circuit 216 disassembles the control information being received from optical fiber link 104 into information that must be transferred to port controllers and information that will be utilized to control the operation of BSSU 120. Both types of information are placed on different bits of control bus 223. Similarly, control information that is being received by the receive TSIs from the port controllers via the interconnecting optical fiber links is placed on control bus 223. Circuit 216 extracts this received control information from control bus 223 and combines it with the SDH rows that are being transmitted out on optical fiber link 104 to switch controller 101.

Figure 3:
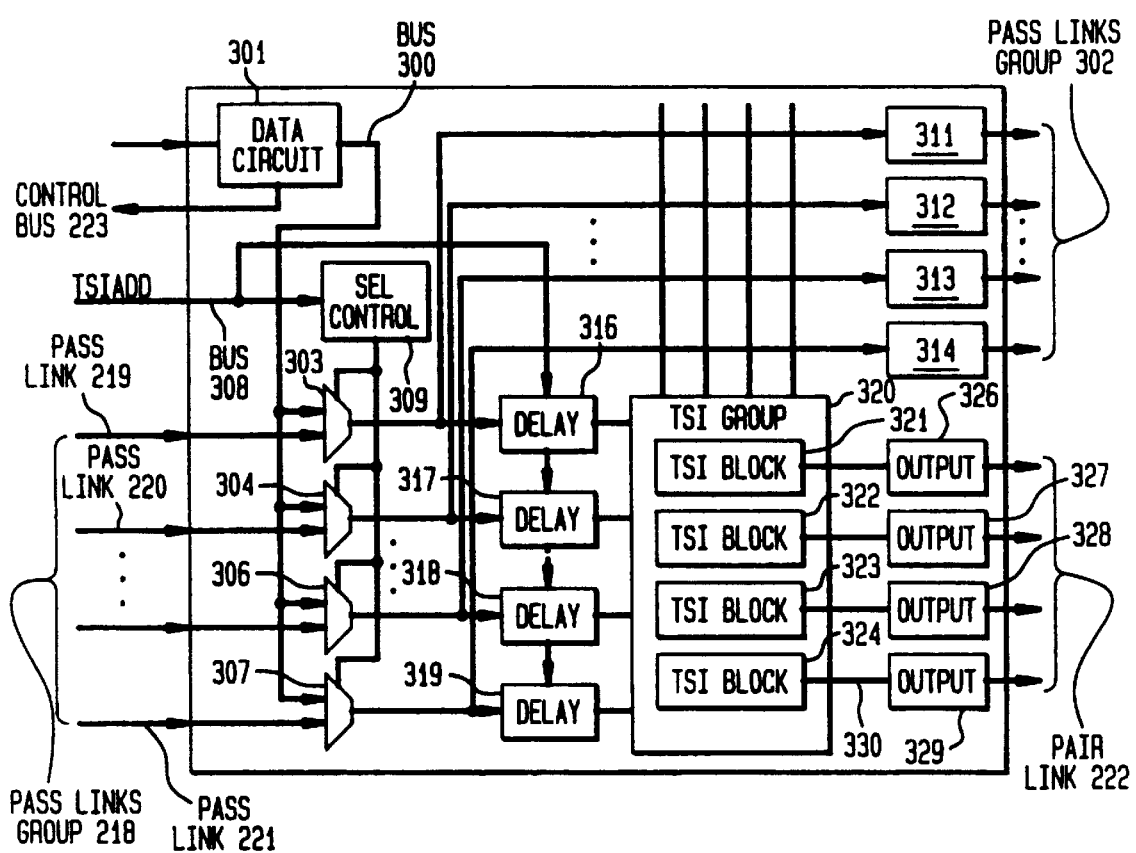
FIG. 3 illustrates, in block diagram form, a first type of timeslot interchange (TSI) unit.

Consider now receive TSI 206 as illustrated in FIG. 3. The other receive TSIs are identical in design. Data circuit 301 receives the information from optical transceiver 201 and provides the necessary elastic storage function and timing recovery so as to match the timing of the received data with the internal timing of TSI 206. One skilled in the art readily knows how to provide the functions of data circuit 301. Data circuit 301 takes the serial bit stream and forms this into eight slower bit streams that are transmitted synchronously on bus 300 to selectors 303–307. There are sixteen selectors. Each of the eight slower bit streams contain data for four STM-1 links. Each selector is selecting four bits from bus 300 or four bits from a pass link of pass links group 218. The selectors are controlled by selector control 309 which is responsive to a TSI address being received on bus 308. The TSI address is permanent for each TSI. Only two selectors are selecting bits from a data circuit at any time in a receive TSI. In the present example of TSI 206, control 309 selects the eight bits from data circuit 301 to be outputted on selectors 303 and 304. The remaining selectors will each select four bits from the pass links group 218. For example, selector 307 receives the four bits being transmitted on pass link 221. The outputs of selectors 303–307 are transmitted to pass forward output circuits 311–314 and delay circuits 316–319. The outputs of circuits 311–314 are transmitted on pass links which make up pass links group 302 to TSI 207. Note, that TSI 207 is responsive to the four bits being received from pass forward output circuit 312 to perform the same delay functions as will be described for delay circuit 316 of TSI 206. Data circuit 301 also extracts the control information coming from the port controller which is destined to be transmitted out on optical fiber link 104 to switch controller 101. This control information is inserted onto control bus 223 and is properly combined by circuit 216 of FIG. 2 into the information being transmitted on optical fiber link 104.

The function of delay circuits 316–319 is to properly align the 8 bits being received from data circuit 301 and the remaining 56 bits from pass links group 218. This is necessary since the eight bits that are received by TSI 208 of FIG. 2 which are then transferred via TSIs 209–214 to TSI 206 are delayed 15 internal clock cycles as compared to the data that data circuit 301 is transferring to selectors 303 and 304. Since the amount of delay for each delay block depends on the position of the TSI relative to other TSIs in FIG. 2, the TSI address is also utilized to control delay circuits 316–319.

The outputs of the delay circuits 316–319 are fed into TSI group 320 which comprises TSI blocks 321–324. For simplicity of FIG. 3, it is not illustrated that each of the four bits coming from each delay circuit is connected to each of TSI blocks 321–324 of TSI group 320. Each of TSI blocks 321–324 is responsive to the 64 incoming bits to perform a timeslot interchange function and to output one bit to its associated output circuit of output circuits 326–329. For example, TSI block 321 transmits its switched bit to output circuit 326. Output circuits 326–329 transfer their four bits via pair link 222 to TSI 207. These four bits are combined with the four bits that are the switched output of TSI 207. TSI 207 transmits the combined bits to optical transceiver 201 for transmission on link 108.

Figure 4:
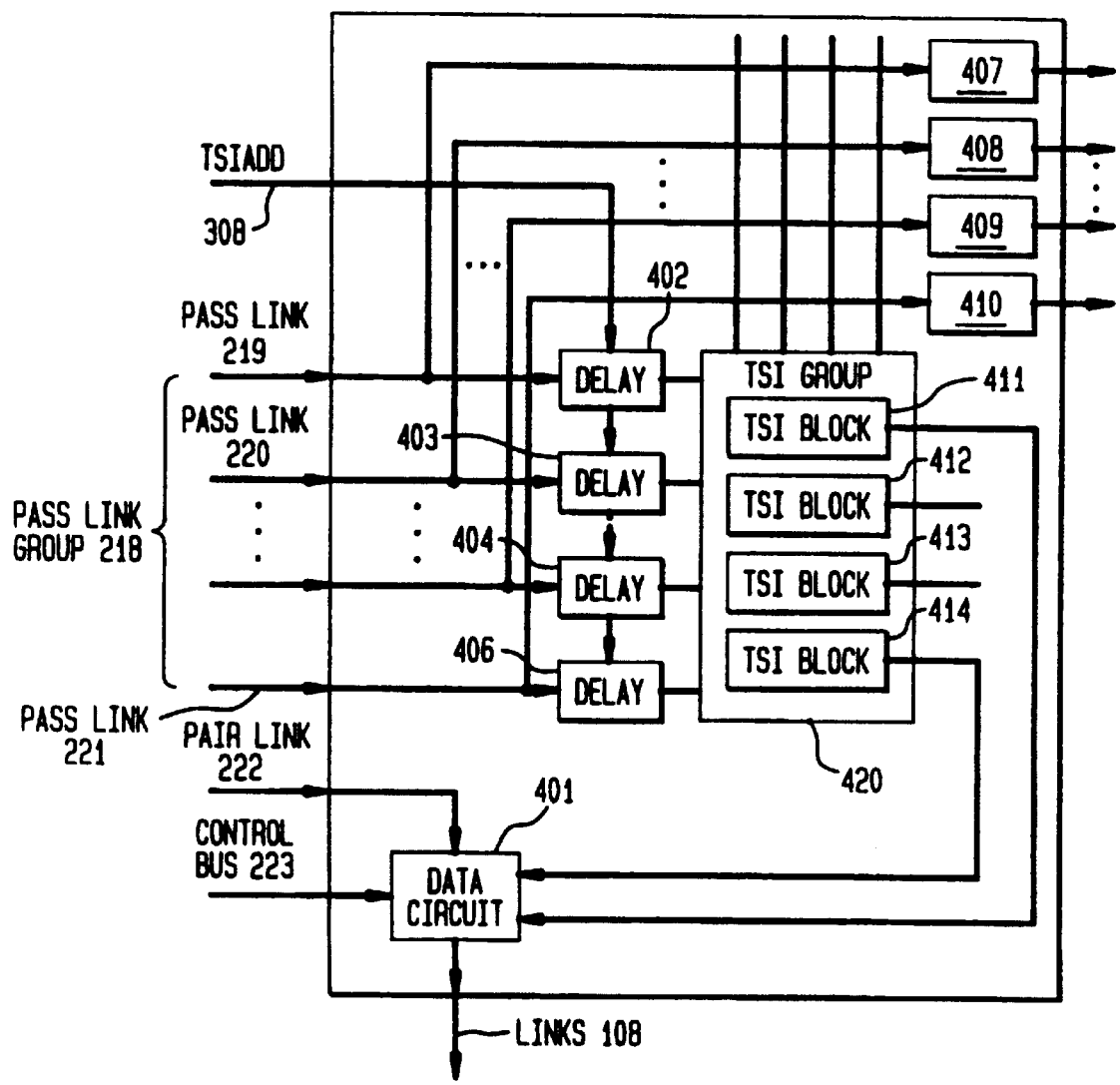
FIG. 4 illustrates, in block diagram form, a second type of TSI unit.

FIG. 4 illustrates TSI 207. Delay box 402–406 perform the same functions as delay blocks 316–319 of FIG. 3. TSI blocks 411–414 perform the same functions as TSI blocks 321–324 of FIG. 3. Pass forward blocks 407–410 perform the same functions as pass forward blocks 311–314 of FIG. 3. One skilled in the art could readily envision that the TSIs of FIGS. 3 and 4 could be one common integrated circuit with the unused portions simply being disabled depending whether the circuit was being used as a receive or transmit TSI. The selection could be based on information in the TSI address. Data circuit 401 is responsive to the outputs from TSI blocks 411–414 and the four bits being received via pair link 222 from TSI 206 to perform proper framing for transmission on optical fiber link 108. In addition, data circuit 401 combines the control information that has been separated by circuit 216 of FIG. 2 and placed on control bus 223 into the information being transmitted on optical fiber link 108 to BSIU 111 using techniques well known in the art.

Figure 5:
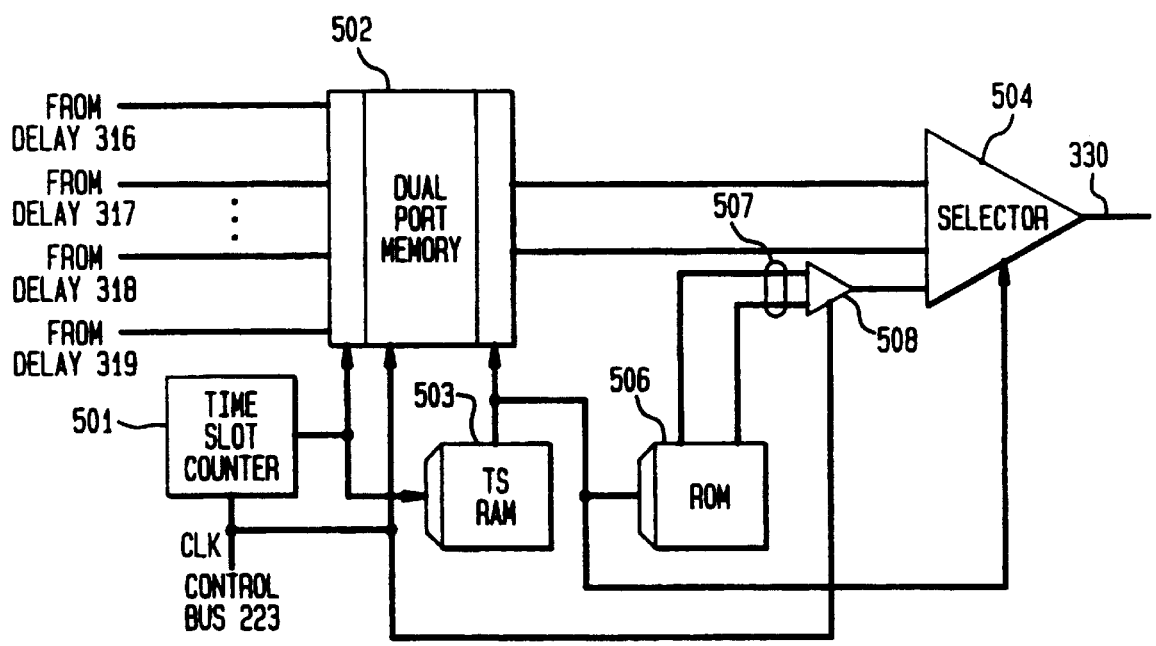
FIG. 5 illustrates, in block diagram form, a TSI block of a first or second type of TSI unit.

FIG. 5 illustrates, in block diagram form, TSI block 321 of FIG. 3. TSI blocks 322–324 of FIG. 3 and TSI blocks 411–414 are identical in design. The 64 bits of information that is being generated each clock cycle by delay blocks 316–319 are loaded into dual port memory 502 under address control of timeslot counter 501. After four clock cycles, one bit of data for all 256 STM-1 links of FIG. 1 has been loaded into dual port memory 502. For each timeslot, timeslot counter 501 is incremented until it returns to zero and continues to be incremented from zero on up. Counter 501 cycles once for each multiframe being received by BSSU 120. The contents of timeslot RAM 503 are set by information received from control bus 223 which has been transmitted to BSSU 120 from switch controller 101 via fiber optical link 104. The manner is which this is loaded into TSI RAM 503 is well known in the art. Each word in TSI RAM 503 defines for each timeslot which of the words that were stored in dual port memory 502 from 64 input bits is to be selected. Under control of TSI RAM 503, ROM 506 provides fixed pattern signal generation operations. The contents of TSI RAM 503 and ROM 506 implement the full SDH switching function. The selected 64 bits of dual port memory 502 and one bit from selector 508 are sent to selector 504 which under control of a portion of the word from TSI RAM 503 selects one bit out of the 65 bits and transmits this single bit on link 330 to output circuit 326 on FIG. 3. ROM 506 outputs 8 bits on cable 507 to selector 508. The latter selector selects one of these bits for transmission to selector 504 in response to control bits on bus 223 if ROM 506 is the data source.

Since at any point in time each TSI block in each of TSI 206–214 of FIG. 2 has the same information and can output information from any particular STM-1 link for transmission on all STM-1 links, a full broadcast switching capability is realized within BSSU 120. Hence, together, BSSUs 120–129 provide a full broadcast capability of all bits of the STM-1 links. Further, any combination of full to partial broadcast capability can be provided from any number of STM-1 links to the remaining STM-1 links. Advantageously, this capability is made possible by bit slicing the functions performed by BSSU 120–129 into individual bit slices.

With respect to the broadcast capability, it is important to realize that there are the equivalent of 63 E1 trunks being transported by each STM-1 link. The lowest piece of data that can be switched in the SDH switching protocol is a E1 trunk. This means that one incoming E1 trunk can be switched to all other outgoing E1 trunks. This results in a large broadcast capabilities, since one E1 trunk could be switched to 16,127 other E1 trunks.

One skilled in the art could readily envision that whereas the present embodiment describes the switching for performing the SDH switching functions, other protocol switching could be performed on the incoming links.

Figure 6:
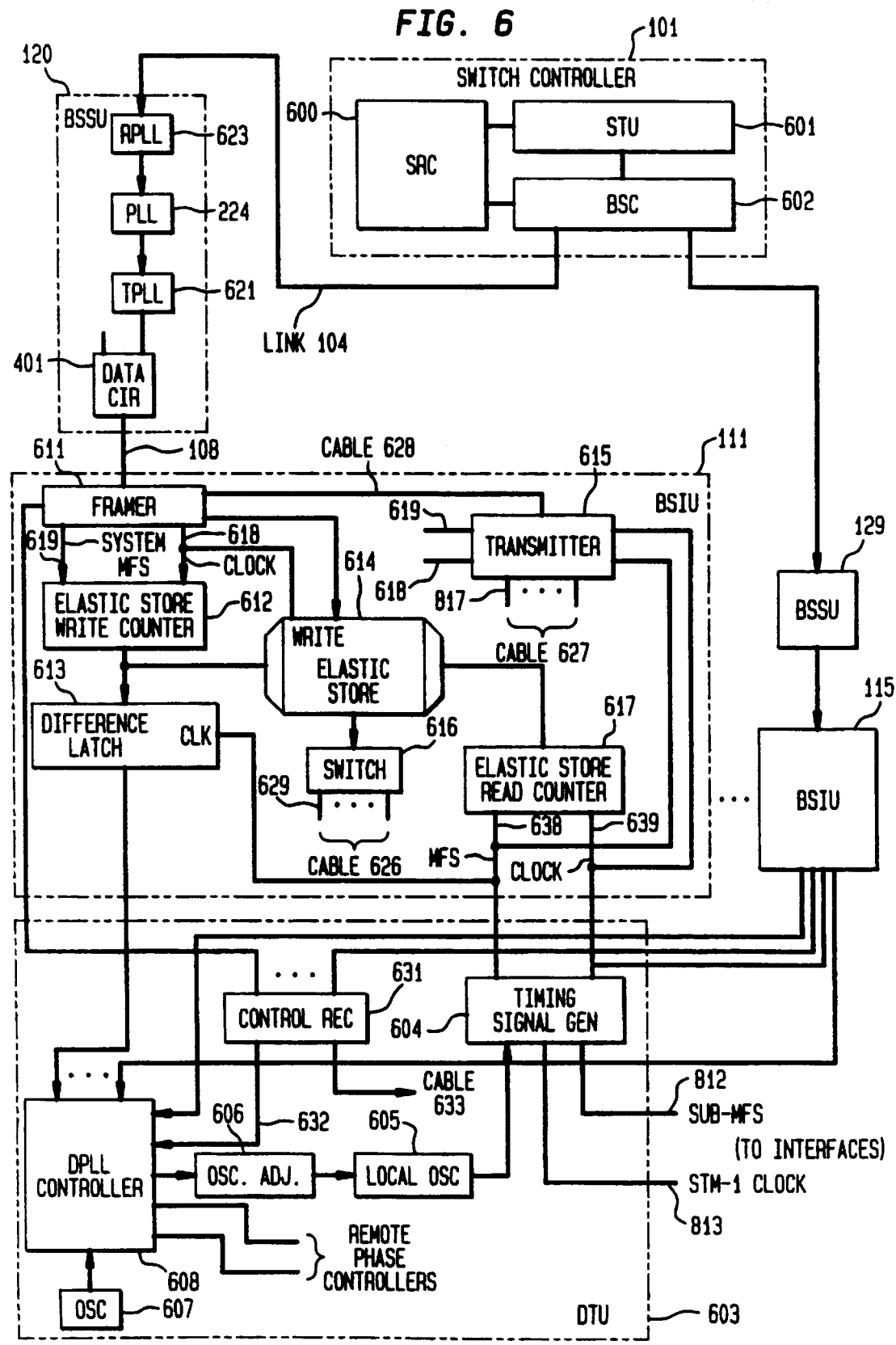
FIG. 6 illustrates, in block diagram form, greater details of a bit slice interface unit and a port controller.

Turning now to the manner in which timing is transferred from the switch controller 101 to the port controllers. Each port controller has ten paths over which timing information can be received from switch controller 101. FIG. 6 illustrates these paths for port controller 116. FIG. 6 illustrates the timing paths from bit slice control (BSC) 602 of switch controller 101 to digital timing unit (DTU) 603 of port controller 116 in subrack 110. The other subracks have similar DTUs. BSC 602 receives the timing information from system timing unit (STU) 601. BSC 602 transmits the timing information embedded with control information to the BSSUs via links such as link 104. Digital phase loop (DPLL) controller 608 in conjunction with the BSIUs, such as BSIU 111, is responsive to the timing information recovered from the links feeding into the BSIU 111–BSIU 115 to calculate an adjustment for local oscillator 605 utilizing well known techniques. With this adjustment, the output of local oscillator 605 is in phase and frequency synchronization with STU 601 of subrack controller 101 that defines the system frequency.

Digital phase loop (DPLL) controller 608 performs this operation by averaging the differences of the phase and frequency of the information being received by BSIU 111–115. DPLL controller uses this average difference to control the output of local oscillator 605 by supplying information to oscillator adjustment circuit 606 that adjusts local oscillator 605. As described in the next paragraph, even though the transmission on the links between BSC 602 and BSSUs 120–129 is based on a common time base, phase noise occurs on the paths before extraction of phase and frequency information by the BSIUs because of the fact that a series of PLLs are utilized in each of the paths to DTU 603.

As illustrated in FIG. 6, BSSU 120 is responsive to the control information being transmitted on link 104 to first recover the frequency being transmitted on link 104 utilizing RPLL 623 for purposes of storing the information in an elastic store. BSSU 120 for purposes of internal timing generates the timing information utilizing PLL 224. Data is transmitted out from BSSU 120 via link 108 utilizing timing generated by TPLL 621 which supplies the frequency for data circuit 401. Thus, BSSU 120 uses three PLLs in series resulting in some jitter of the basic system timing.

The data transmitted on link 108 is then framed by framer 611 which utilizes a RPLL similar to RPLL 623. Framer 611 recovers the data being transmitted on link 108 and places that in elastic store 614 utilizing an address generated by elastic store write counter 612. Note, that framer 611 converts the single bit stream being transmitted on link 108 into eight slower parallel bit streams that are stored in elastic stores 614. Within each of the bit streams stored in elastic store 614 is groups of data each of which is to be transmitted out on four of the STM-1 links interconnected to subrack 110. On read out, switch 616 separates out from each of the data streams stored in elastic store 614 the data for the individual STM-1 links before transmitting this information to the appropriate port unit, such as port unit 117, in subrack 110. These data streams are transmitted via cable 626 to each individual port unit. The information is read out of elastic store 614 under control of elastic store read counter 617.

Figure 8:
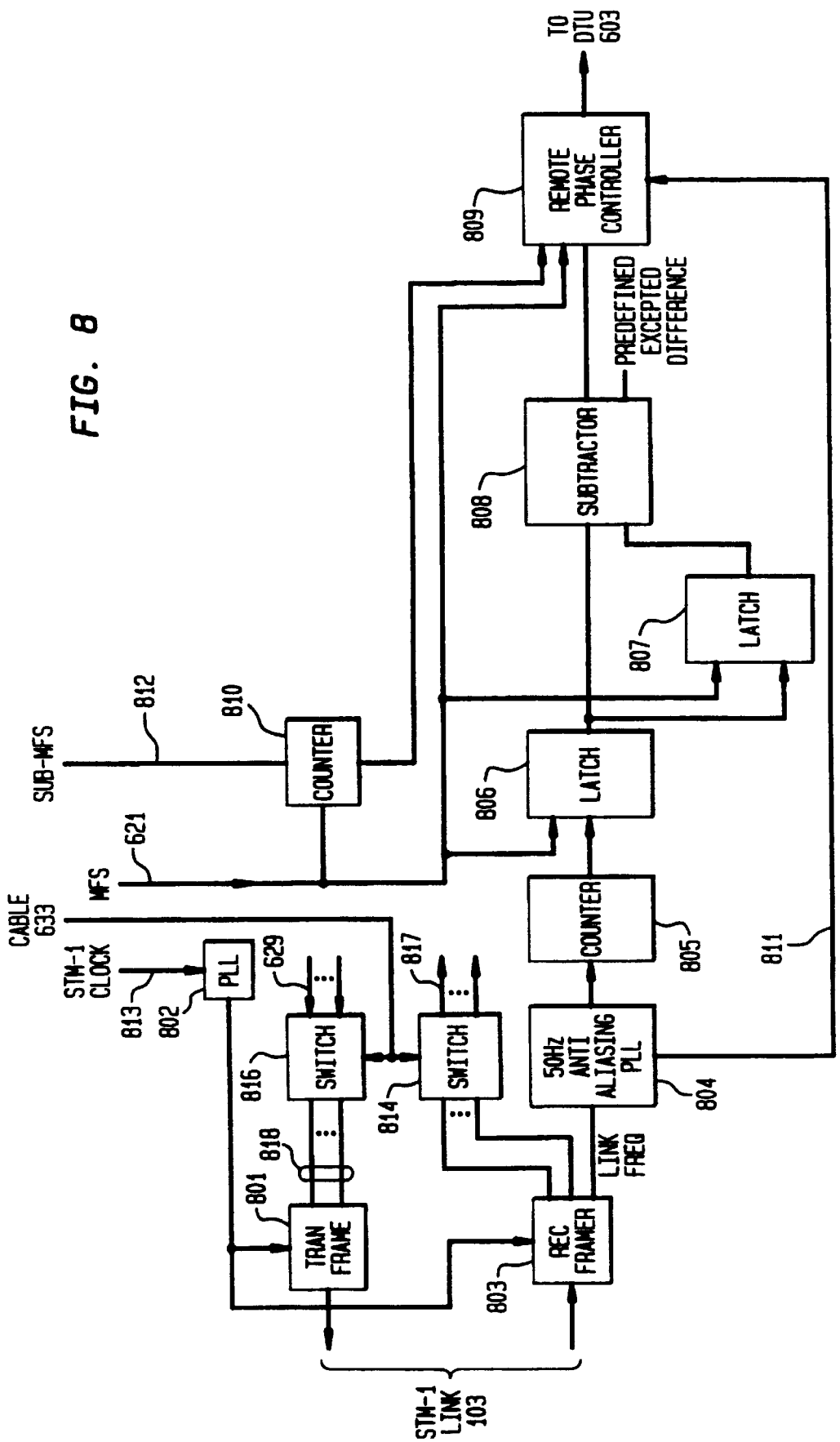
FIG. 8 illustrates, in block diagram form, a port unit.

Transmitter 615 performs a similar operation as performed by elements 612–617 except that it transmits data. Transmitter 615 is responsive to outputs from individual STM-1 links received from port units such as port 117 illustrated in FIG. 8. As illustrated in FIG. 8, switch 817 transmits the received information from the STM-1 link received from receive framer 803 after having separated it into individual data bit stream for each of the BSIUs. For example, transmitter 615 receives one such data bit streams via lead 817 which is part of cable 627. Transmitter 615 is responsive to the bit streams being received from cable 627 to form these into eight bit streams with each of the eight bit streams containing data for four STM-1 links. This information is transferred to framer 611 via cable 628. Framer 611 then transmits this information on bilateral optical link 108 utilizing the system MFS signal and clock signals received from timing signal generator 604. Transmitter 615 transmits the information to Framer 611 utilizing timing received from timing signal generator 604. Framer 611 relays the information via optical fiber link 108 to data circuit 401 of BSSU 120. Data circuit 401 utilizes an elastic store similar to elastic store 614 to place the information received from transmitter 615 in synchronization with the timing being generated by PLL 224. As will be explained later, each port unit under control of BSC 602 makes the decision as to which BSIU each of the bit positions incoming on the STM-1 link is to be transmitted.

Control information being transmitted from BSC 602 via the BSSUs is separated out by the framers of the BSIUs, such as framer 611, and transmitted to control receiver 631 of DTU 603. Control receiver 631 chooses the control information which is identical from the majority of the BSIUs 111–115. Control receiver 631 separates the control information intended for DPLL controller 608 and transmits this information on cable 632 to DPLL controller 608. Control receiver 631 extracts the control information that controls the designation of which bit positions of the connected STM-1 links will be communicated by the individual port units to BSIUs 111–115. This control information is transmitted to the port units via cable 633. Advantageously, the use of multiple control information paths allows a simple hardware circuit such as control receiver 631 to determine the final control information which allows quick response to new control information.

The purpose of elastic store 614 is to allow the buffering of the data being received from link 108 so that this data can be read out of the elastic store 614 and transmitted to the proper port units in synchronization with equivalent elements in other BSIUs in the subrack. Elastic store write counter 612 is controlled by the frequency being generated by the clock signal on lead 618 from framer 611 and the system multiframing strobe (MFS) signal being transmitted on lead 619. Framer 611 recovers these two signals from the timing information embedded in the data being transmitted on link 108. The system MFS signal defines the start of each multiple frame of the data being transmitted on link 108, and the clock signal defines the rate at which framer 611 presents a new bit for each of the eight parallel data streams being written into elastic store 614. System MFS signal from link 108 defines when elastic store write counter 612 should be zero. Similarly, elastic store read counter 617 is controlled by MFS signal being transmitted on lead 638 and clock signal being transmitted on lead 639 from timing signal generator 604 of DTU 603. Timing signal generator 604 is controlled by the output by local oscillator 605. If the frequency and phase being generated by local oscillator 605 has been identical to the frequency and phase of the oscillator utilized by BSC 602 of a switch controller 101 for a long period of time, the contents of elastic store write counter 612 will be equal to illustratively half the maximum count value when the MFS signal on lead 638 sets elastic store read counter 617 to zero. This function is performed by DPLL controller 608. This difference in the contents of elastic store write counter 612 and elastic store read counter 617 is designed to allow for fluctuations in the frequency being utilized by DTU 603 and the system frequency being utilized by BSC 602 of switch controller 101.

Consider now in detail how DPLL controller 608 adjusts the frequency of local oscillator 605. On the occurrence of subrack MFS signal, the contents of elastic store write counter 612 are strobed into latch 613. Each of the BSIUs 112–115 has a similar latch to latch 613. DPLL controller 608 reads the contents of each of these latches in response to the subrack MFS signal. DPLL controller 608 then illustratively subtracts from each of the latch contents half of the maximum value that can be stored in elastic write counter 612. The resulting number for each of the BSIUs 111–115 defines the difference in the phase of local oscillator 605 and the phase of the system frequency as recovered from each individual BSIU from its incoming link from its associated BSSU. DPLL controller 608 is responsive to these resulting numbers to perform the operations illustrated in FIG. 7.

Figure 7A:
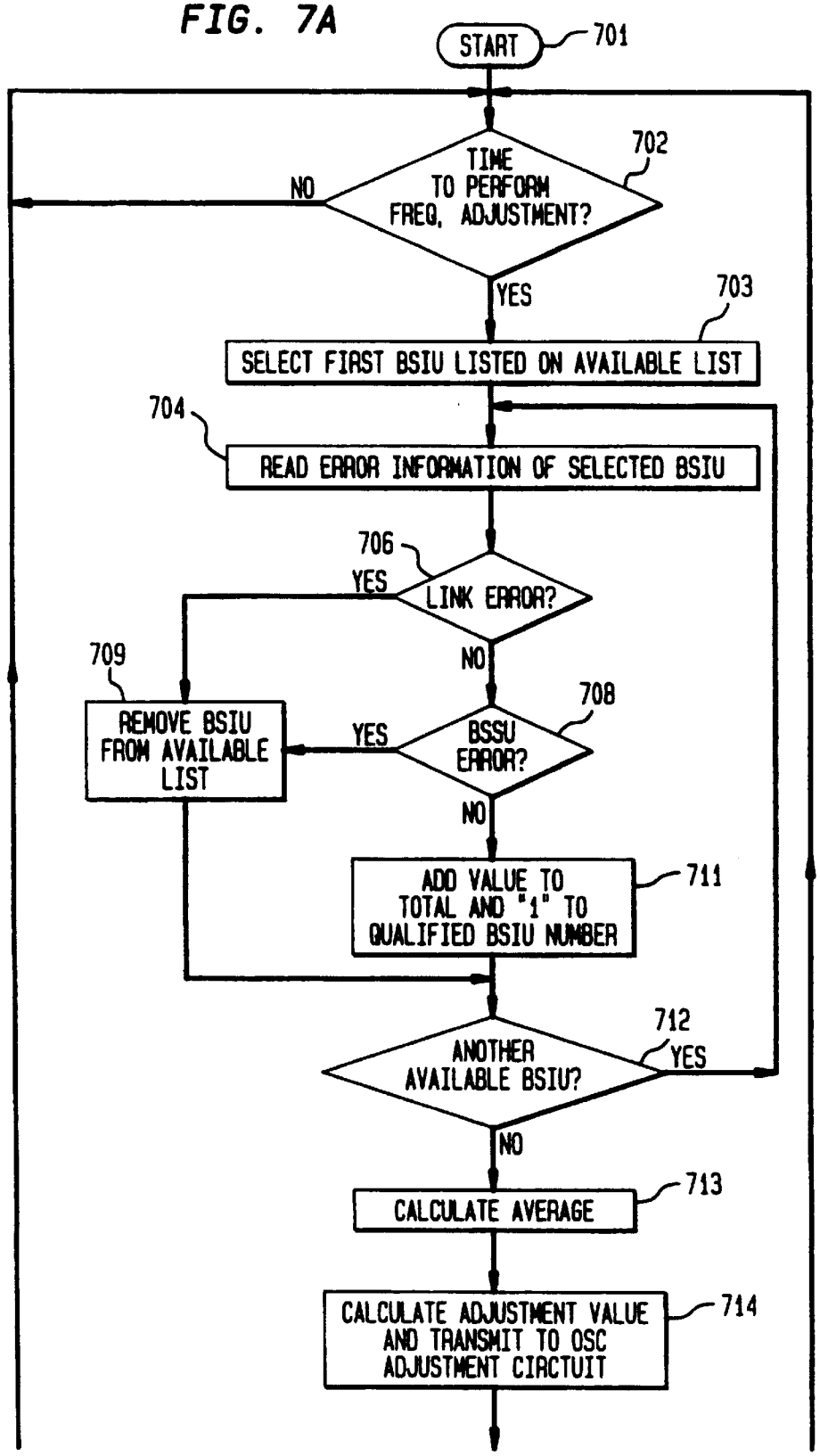
FIG. 7 illustrates, in flow chart form, operations performed by a DPLL controller of a port controller in adjusting the frequency of a local oscillator.
Figure 7:
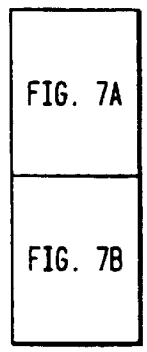
Figure 7B:
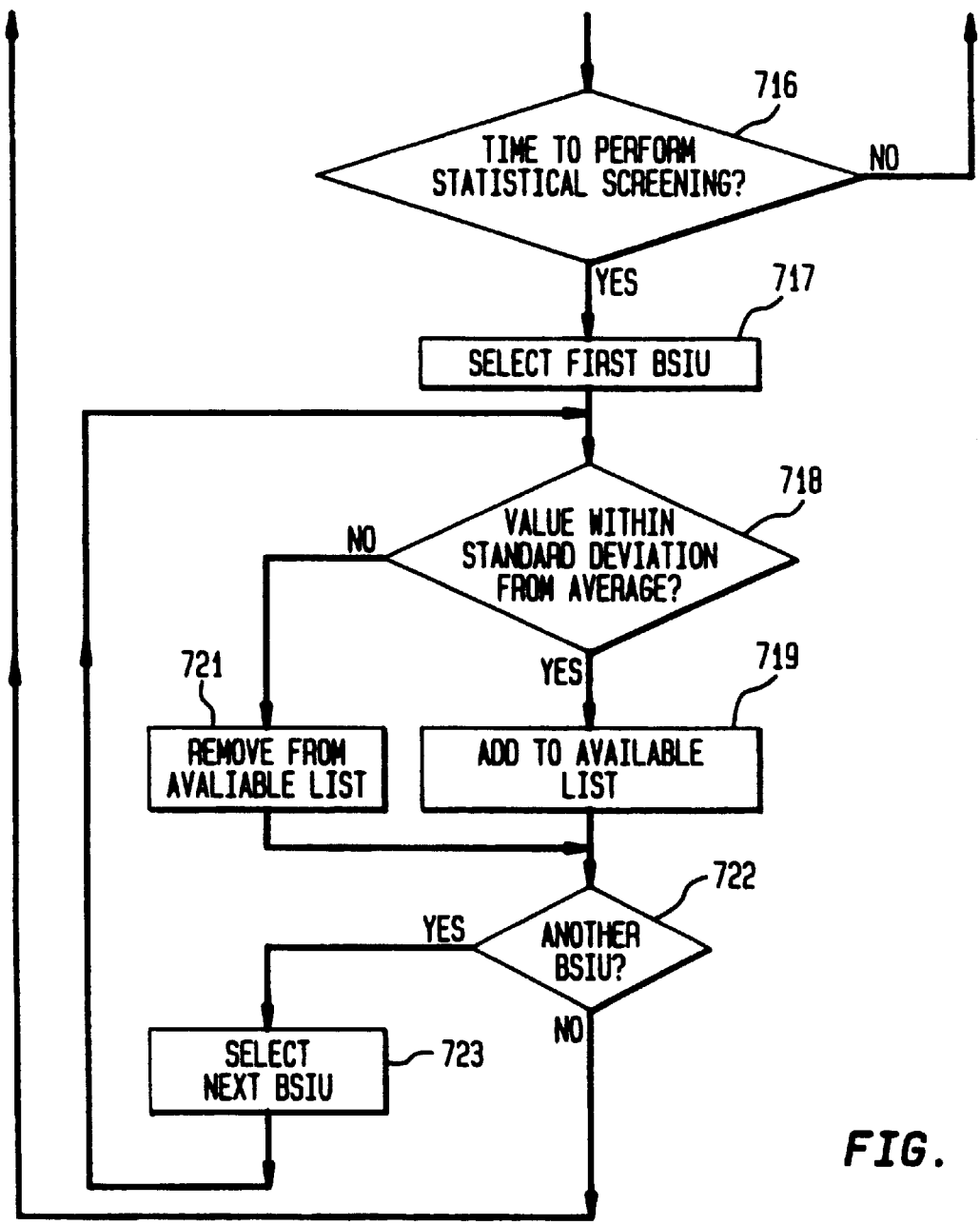

FIG. 7 illustrates, in flow chart form, the steps performed by DPLL controller 608 of DTU 603 illustrated on FIG. 6 in adjusting the frequency of local oscillator 605. Once the operations are started by entry into start block 701, decision block 702 determines if the time period has elapsed for performing the calculations to adjust the frequency of local oscillator 605. Advantageously, the time period is 1 msec. If the answer is no, decision block 702 is repeated. If the answer in decision block 702 is yes, block 703 selects the first BSIU listed as being available in the available list. The available list defines those BSIUs whose timing had previously been determined to be accurate. Next, block 704 reads the error information associated with the selected BSIU. This error information is obtained from the framer of the selected BSIU such as framer 611 of BSIU 111. Decision block 706 determines if a link error had been detected on the link interconnecting the selected BSIU with its associated BSSU. If the answer is yes that an error was detected, control is transferred to block 709 which removes the selected BSIU from the available list. After execution of block 709, control is transferred to decision block 712 whose operation will be described later in this paragraph. Returning to decision block 706, if the answer is no, decision block 708 determines if information from the associated BSSU indicated an internal error in the associated BSSU. This information is also obtained from framer 611. If the answer in decision block 708 is yes, control is transferred to block 709 whose operations were previously described. If the answer in decision block 708 is no, block 711 adds the value from the difference latch of the selected BSIU such as difference latch 613 after subtracting half of the maximum count of the elastic store write counter from this value into a total which is being maintained for later use. After execution of block 711, decision block 712 determines if there is another BSIU listed in the available list. If the answer is yes, that BSIU is selected and control is transferred back to block 704 by decision block 712.

Returning to decision block 712, if the answer is no, block 713 determines the average of the information from the latches of the BSIUs that qualified by dividing the calculated total by the number of qualified BSIUs. Both of these numbers were calculated in block 711. Using the average number takes advantage of the fact that uncorrelated noise decreases as the number of usable sources increases. Block 714 then utilizes this average number to calculate an adjustment value using techniques well know in the art and transmits the adjustment value to the oscillator adjustment circuit such as oscillator adjustment circuit 606. Control is transferred to decision block 716.

Decision block 716 determines whether the time has elapsed for performing a statistical screening test on the BSIUs in the available list. If the answer is no, control is transferred back to decision block 702. The statistical screening is advantageously performed every ten msec. One skilled in the art could readily see that the statistical screening could be performed at different intervals. If the answer is yes in decision block 716, block 717 selects the first BSIU which advantageously would be BSIU 111. Decision block 718 then calculates the standard deviation from the average and determines whether the value read from the difference latch of the selected BSIU is within the standard deviation from the average value which was calculated in block 713. If the answer is no in decision block 718, the selected BSIU is removed from available list before control is transferred to decision block 722. Returning to decision block 718, if the answer is yes, block 719 adds the selected BSIU to the available list before transferring control to decision block 722. Decision block 722 determines if there is another BSIU to be statistically screened. In the present example, the last BSIU to be screened will be BSIU 115. If the answer is yes in decision block 722, block 723 selects the next BSIU and transfers control back to decision block 718. If the answer in decision block 722 is no, control is transferred back to decision block 702.

The discussion of FIG. 7 is in terms of selecting a BSIU which has recovered a frequency from the optical fiber link with the associated BSSU that is stable enough to be utilized to calculate the adjustment for local oscillator 605. However, for example with respect to BSIU 111, one skilled in the art readily sees that what is being selected is the path comprising optical fiber link 108, the integrity of BSSU 120, and port unit 117. It is this path from BSIU 111 to BSC 602 that is being selected and qualified.

FIG. 8 illustrates port unit 117. The other port units are similar in design. Data is transmitted out on STM-1 link 103 under timing control of PLL 802 utilizing the STM-1 clock signal on lead 813 from timing signal generator 604 of DTU 603. Note, the transceiver is not illustrated in FIG. 8 but is well known to those skilled in the art This transmission is done utilizing well known techniques. Incoming data from STM-1 link 103 is framed by receiver framer 803.

Of interest in FIG. 8 is the manner in which the remote phase detection is performed so that STU 601 can be locked in phase and frequency to STM-1 link 103 via port unit 117. The link frequency is recovered by receiver framer 803 and transmitted to anti-aliasing PLL 804. PLL 804 has a 50 Hz low pass phase transfer function and communicates the resulting filtered signal as a digital clock signal to counter 805. In addition, PLL 804 transmits to remote phase controller 809 information concerning whether there is excessive jitter or loss of clock on the incoming link via cable 811. Counter 805 is a free running counter which simply counts up and returns to zero. The output of counter 805 is latched into latch 806 under control of the MFS signal received via lead 638 from timing signal generator 604. The MFS signal occurs every 500 microseconds and is transmitted on lead 638 of FIG. 6. The SUB-MFS signal is the MFS signal reduced by a multiple of 17 and is transmitted on lead 812. The previously latched data from latch 806 is clocked into latch 807 by the MFS signal. Subtractor 808 calculates the difference between the contents of latches 806 and 807. The difference between latches 806 and 807 represents the number of input clock periods which occurred during the last MFS interval. An expected difference number is then used to reduce the number of bits that must be transmitted by remote phase controller 809. The expected difference number is the number of clock periods which could be expected if STU 601 is in perfect synchronization with the STM-1 link to which STU 601 is synching. It is this expected difference that is then subtracted by subtractor 808 from the difference between the contents of latches 806 and 807 to obtain a final difference. This final difference is then used to represent the incremental difference in phase in the 500 microsecond interval between the link frequency and the frequency being generated by local oscillator 605 of FIG. 6. Since the frequency of local oscillator 605 is basically the system frequency generated by STU 601 and utilized to time the system illustrated in FIG. 1, the final difference represents the difference between link frequency and system frequency over one MFS interval. This final difference is transmitted to STU 601 and is utilized by that circuit to adjust the system frequency until the system frequency matches the link frequency in phase and frequency.

Remote phase controller 809 forms a remote phase message at the occurrence of each MFS signal. The remote phase message consists of the present difference from subtractor 808 and the sum of the differences (also referred to as the summation of differences) that occurred over the last 16 calculations. One skilled in the art could readily envision that different sums could be calculated other than the summation of the last sixteen calculations. For example, the sum of the difference that represented two calculations could be calculated. Further, one skilled in the art could readily envision that a plurality of sums of differences could be transmitted in the remote phase message at the occurrence of each MFS signal. In addition, the message includes the information transmitted via cable 811 from PLL 804 plus the contents of counter 810. Counter 810 is a simple binary counter that counts to 16 and then resets to zero. The contents of counter 810 define the sequence of the remote phase messages generated by remote phase controller 809. The remote phase messages are transmitted to DPLL controller 608 of DTU 603 of FIG. 6. Each port unit is transmitting unique but similar remote phase messages to DPLL controller 608. DPLL controller 608 under control of a message previously received from STU 601 selects illustratively 0, 1 or 2 of these remote phase messages and transmits the selected remote phase message to STU 601 via each of BSIUs 111–115 and BSSUs 120–129. At any one time, STU 601 will only be using the remote phase messages from one port unit. Advantageously, STU 601 can select two remote phase messages from each subrack and up to sixteen such remote phase messages at any given time. One skilled in the art could readily envision that this capability allows STU 601 to perform many types of synchronization operations. STU 601 makes the reference selection based on which STM-1 links have been indicated as having the greatest accuracy of frequency. Such flexibility allows STU 601 to select any one of the 256 STM-1 links terminating on the system illustrated in FIG. 1 as the link to which to adjust the system frequency.

The data being received by port unit 117 from STM-1 link 103 is first framed by receive framer 803. Note, that receive framer 803 includes the functions of the elastic store 614 and associated write and read counters. Information is read out of the elastic store of 803 and transmitted eight bits parallel to switch 814. Switch 814 is responsive to the bit slice control information from control receiver 631 received over cable 633 to form bit streams for the cables going to BSIUs 111–115. For example, one bit stream would be transmitted via conductor 817 to BSIU 111 if BSIU 111 was being utilized to switch data.

Data to be transmitted out on STM-1 link 103 is received by switch 816 from each of the BSIUs 111–115 that is actively switching data. For example, switch 816 receives bits for one bit position of the STM-1 link via conductor 629 from switch 616 via conductor 629. In response to control information being received from control receiver 631 via cable 633, switch 816 arranges the bit positions being received on the incoming connectors so that they have the proper position on the bits being transmitted in parallel to transmitter framer 801 via cable 818. Cable 818 transports eight bits in parallel. Transmit framer 801 is responsive to the eight incoming bits received for each cycle to form these into a serial bit stream for transmission on STM-1 link 103.

Figure 9:
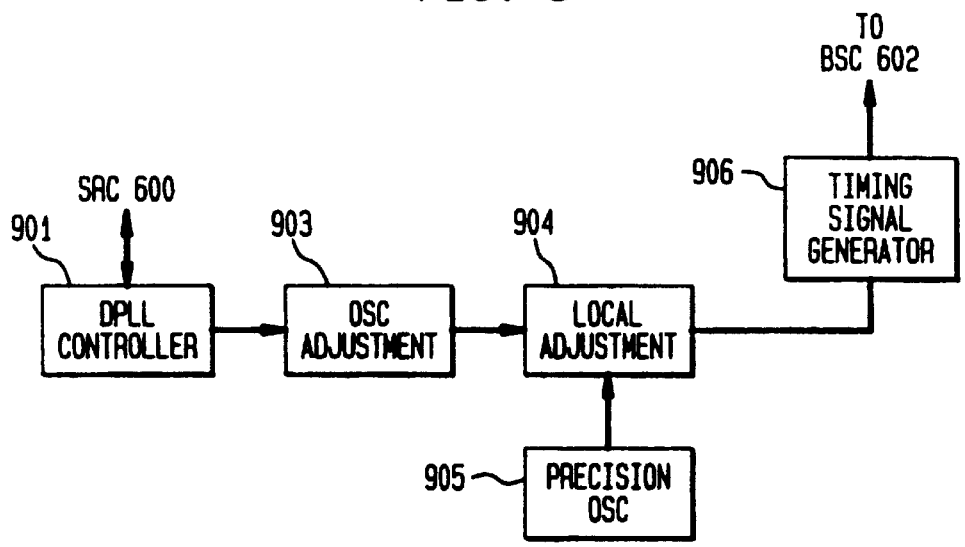
FIG. 9 illustrates, in block diagram form, a system timing unit.

FIG. 9 illustrates in greater detail STU 601 of FIG. 6. The remote phase messages transmitted by remote phase controllers such as remote phase controller 809 of FIG. 8 are first received by BSC 602 which transfers these to STU 601 of FIG. 6. DPLL controller 901 is responsive to the remote phase messages from the selected port unit to control local oscillator 904 with respect to phase via oscillator adjustment circuit 903. Local oscillator 904 is adjusted to precision oscillator 905 and the selected STM-1 link. The algorithm utilized by DPLL controller 901 to perform the adjustment of local oscillator 904 is well known to a person skilled in the art and is disclosed for example U.S. Pat. No. 5,483,201 which is incorporated by reference. The output of local oscillator 904 is utilized to drive timing signal generator 906 which provides the system timing to BSC 602.

Figure 10:
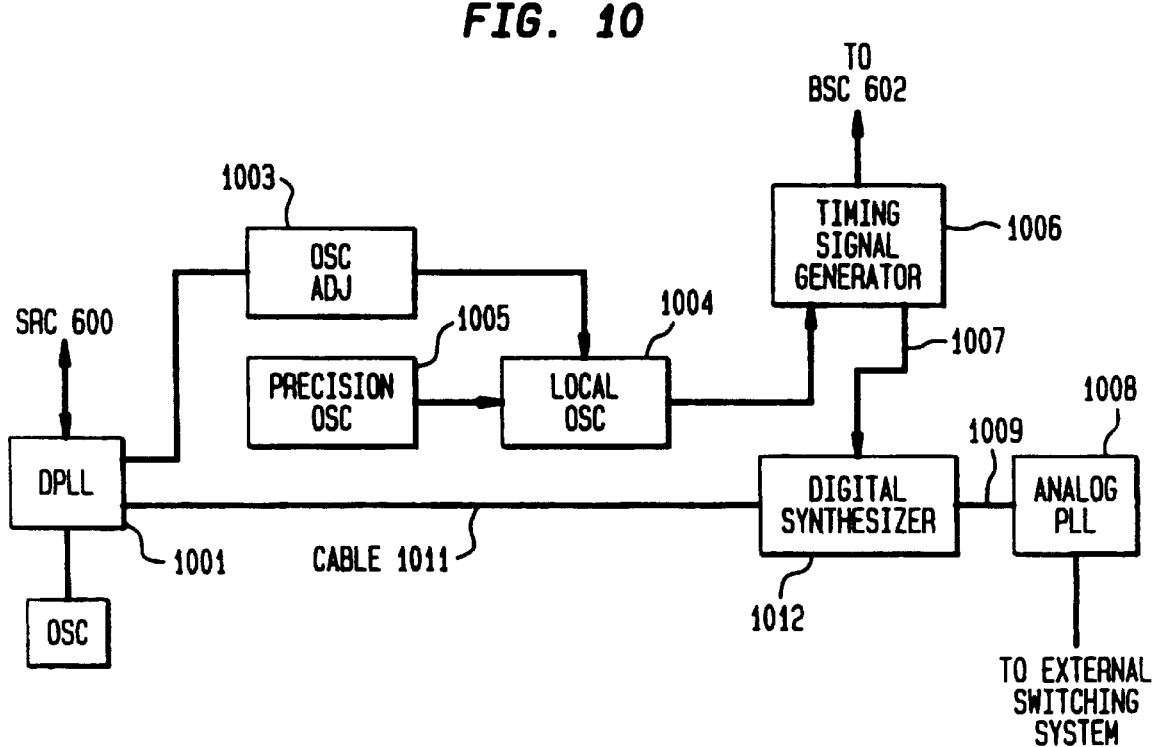
FIG. 10 illustrates, in block diagram form, another embodiment of a system timing unit.

FIG. 10 shows another embodiment of STU 601. In this embodiment, with respect to providing the system frequency for timing signal generator 1006, elements 1001–1005 function in an identical manner to elements 901–905 of FIG. 9. As in the first embodiment of STU 601 of FIG. 9, DPLL controller 1001 is responsive to remote phase messages from a selected port unit to control local oscillator 1004. In addition, physically located with the system illustrated in FIG. 1 is another external switching system that needs to derive its system frequency from another one of the STM-1 links. Since the frequency and phase of timing signal generator 1006 is accurately represented down at each port unit, such as port unit 117, the remote phase messages generated by remote phase controller such as remote phase 809 of FIG. 8 can be utilized to reproduce the frequency of any given STM-1 link by STU 601 utilizing digital synthesizer 1012 of FIG. 10. DPLL controller 1001 is responsive to the remote phase messages to control the number of pulses from timing signal generator 1006 that are allowed to be transmitted to analog PLL 1008 by controlling digital synthesizer 1012. Analog PLL 1008 is responsive to the incoming pulses to reproduce an analog signal that is highly accurate and filtered representation of the frequency and phase of the selected STM-1 link. This analog signal is then transmitted to the external switching system.

Figure 11:
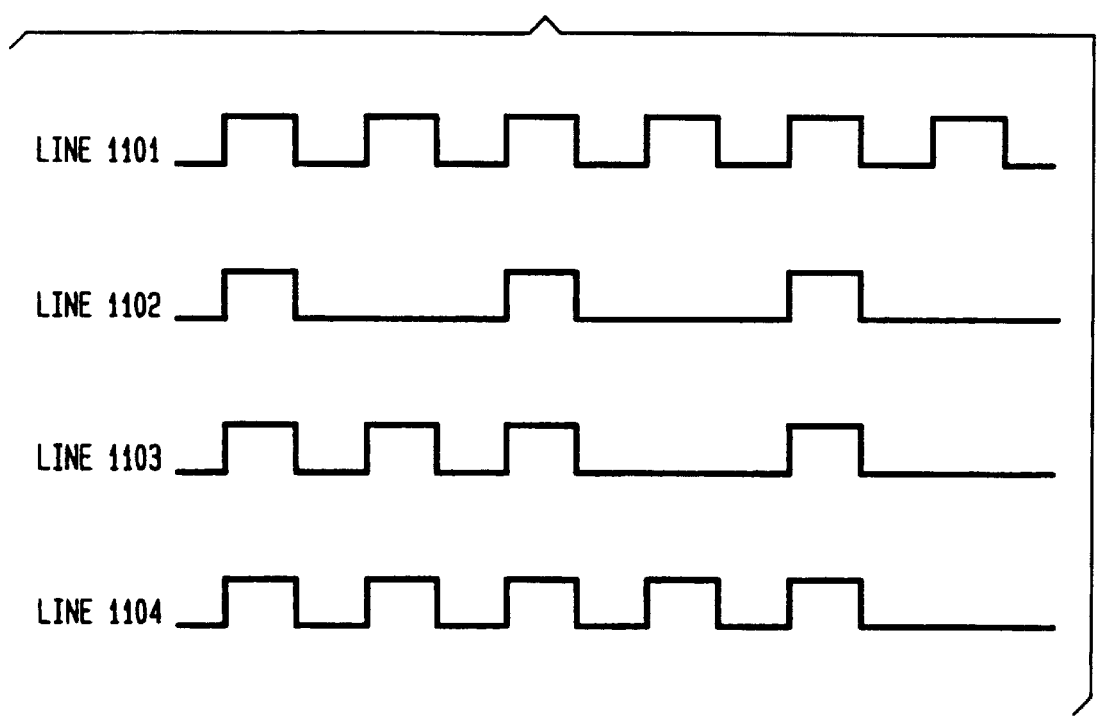
FIG. 11 illustrates a timing diagram.

FIG. 11 illustrates the signals produced by the elements of FIG. 10. Line 1101 illustrates the frequency signals outputted by timing signal generator 1006 on lead 1007. If the frequency and phase of the line frequency signal is identical to the frequency signal outputted by timing signal generator 1006 on lead 1007 for a long period of time, then digital synthesizer 1012 continuously outputs the pulses illustrated on line 1103 of FIG. 11. The result is that for every six pulses being received from timing signal generator 1006 on lead 1007, digital synthesizer 1012 transmits to analog PLL 1008 on lead 1009 four out of the six pulses being received on lead 1007. Analog PLL 1008 is responsive to these pulses to produce advantageously a 2048 kHz signal which is transmitted to the external switching system. If the line frequency of the STM-1 link is lower than the frequency of timing signal generator 1006, digital synthesizer 1012 under control of DPLL controller 1001 adjusts for this difference in frequency by producing three out of six pulses as illustrated in line 1102 until the output of analog PLL 1008 matches the frequency and phase of the STM-1 link. Similarly, if the frequency signal of the STM link is higher than the frequency of timing generator 1006, digital synthesizer 1012 under control of DPLL controller 1001 transmits five out of six pulses for the incoming pulses being received on lead 1007 as illustrated in line 1103. Analog PLL 1008 is responsive to these increased number of pulses to raise the frequency of the signal being transmitted to the external switching system. The design of analog PLL 1008 to be responsive to digital pulses being received on its output to produce a smooth and stable analog signal are well known to those skilled in the art.

Figure 12:
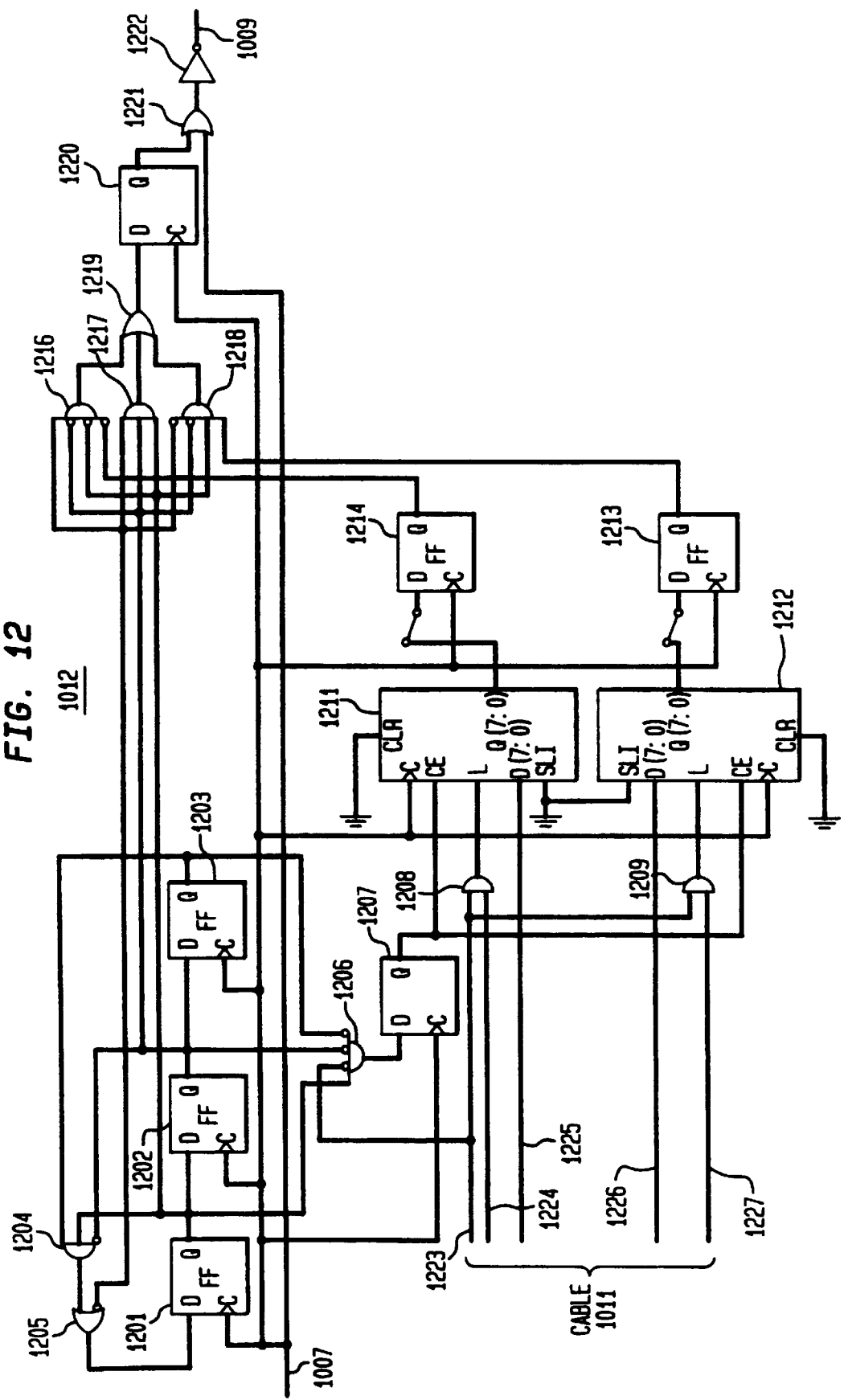
FIG. 12 illustrates a logic diagram of a digital synthesizer.

FIG. 12 illustrates the details of digital synthesizer 1012 of FIG. 10. Elements 1201–1205 form a mod 6 counter that recycles after six clock pulses received on lead 1007 from timing signal generator 1006. The design of mod 6 counters and their operation is well understood by those skilled in the art and the details are not described here. Considering the overall operation of the logic circuit illustrated in FIG. 12, if flip flop 1214 is set, then five pulses out of each cycle of the mod 6 counter as illustrated on line 1103 of FIG. 11 being received on lead 1007 are transferred to lead 1009 via gates 1221 and 1222. If flip flop 1213 is set and flip flop 1214 is not, then three of the pulses out of each cycle of the mod 6 counter as illustrated in line 1102 of FIG. 11 are transferred from line 1007 to line 1009 via gates 1221 and 1222. If neither flip flop 1214 or 1213 is set, then four pulses out of the cycle of the mod 6 counter are transferred from lead 1007 to lead 1009 by gates 1221 and 1222. Gates 1216–1219 are responsive to the state of the mod 6 counter (outputs of flip flops 1201–1203) to control flip flop 1220 which in turn controls gate 1221 to accomplish the previously described operations with respect to flip flops 1213 and 1214. One skilled in the art can readily understand the operations of elements 1213–1222 in their relationship to flip flops 1201–1203 to perform these operations.

The state of flip flop 1214 is determined by the outputs of shift register 1211, and the state of flip flop 1213 is determined by the outputs of shift register 1212 for each cycle of the mod 6 counter. Shift registers 1211 and 1212 each contain eight bits. These eight bits are inserted into the shift registers via data and strobe signals received via cable 1011 from DPLL controller 1001. Data to be loaded into shift register 1211 is received via subcable 1225 and is loaded under control of strobe signals on leads 1223 and 1224. Similarly, data to be loaded into shift register 1212 is received via subcable 1226 and inserted into shift register 1212 under control of strobe signals received on leads 1223 and 1227. Shift registers 1211 and 1212 are only shifted once for each cycle of the mod 6 counter. This shifting of bits within the shift registers is controlled by gate 1206 and flip flop 1207 that allow the clock signal on lead 1007 to shift the shift registers at the start of the cycle of the mod 6 counter.

Figure 13:
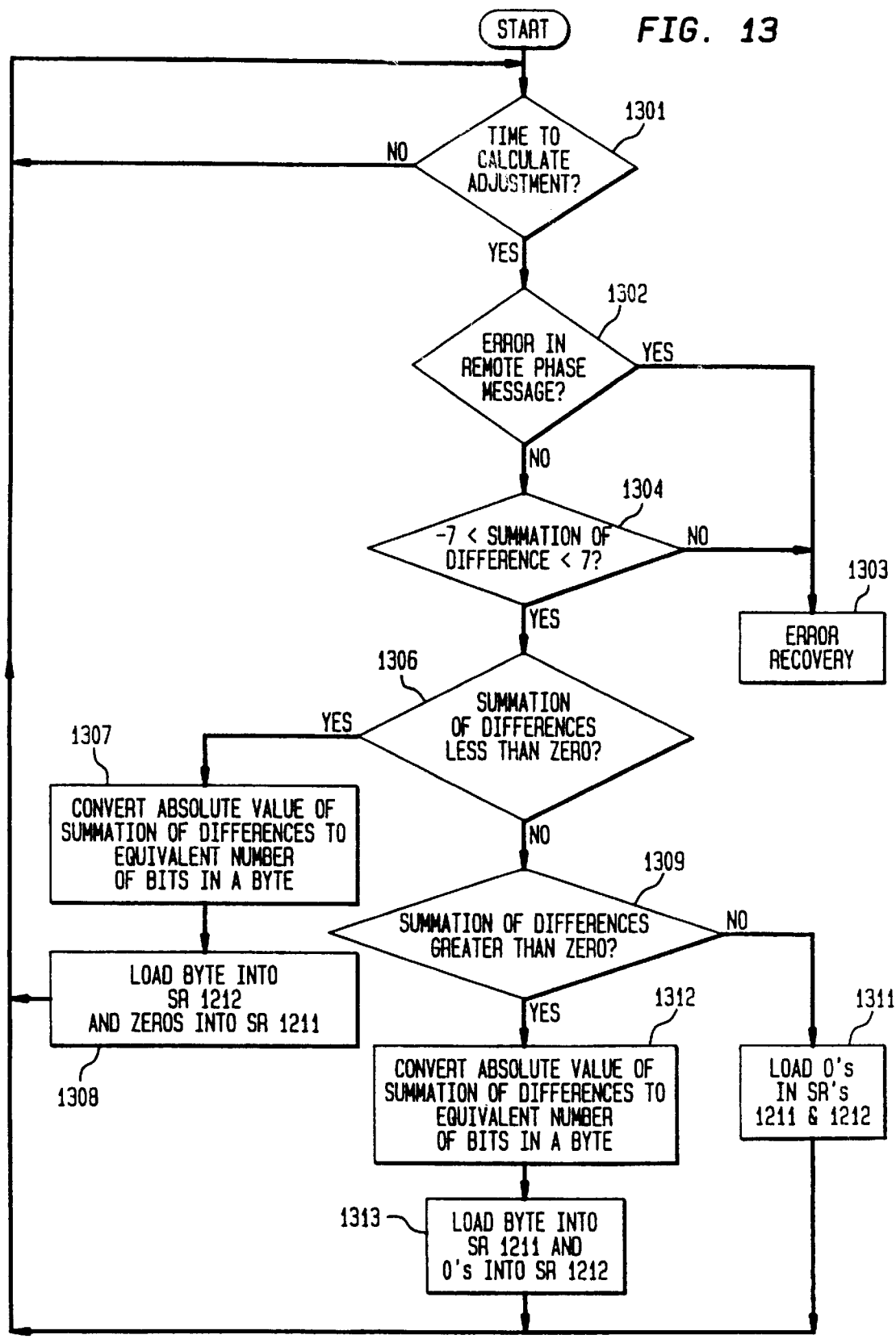
FIG. 13 illustrates, in flow chart form, operations performed by a system timing unit in providing an external frequency for another switching system.

FIG. 13 illustrates, in flow chart form, the steps performed by DPLL controller 1001 in controlling digital synthesizer 1012. Decision block 1301 determines if it is time to perform the calculation of the adjustment to be sent to digital synthesizer 1012. This calculation is performed advantageously every 8 msec. Recall that the remote phase controllers, such as remote phase controller 809 of FIG. 8, calculate a difference between the system frequency and the link frequency every millisecond but maintain a sum of the differences over an 8 msec period. It is this summation of differences that is utilized to adjust digital synthesizer 1012. If the answer is yes in decision block 1301, control is transferred to decision block 1302 to determine if an error occurred in the remote phase message. If the answer is yes in decision block 1302, control is transferred to block 1303 for error recovery. If the answer is no in decision block 1302, control is transferred to decision block 1304 which determines if the summation of the differences is greater than "−7" and less than "7". If the answer is no in decision block 1304, control is transferred to block 1303 for error recovery. If the answer in decision block 1304 is yes, decision block 1306 determines if the summation of the differences is less than zero. If the answer is yes in decision block 1306, control is transferred to block 1307 which converts the absolute value of the summation of differences into the equivalent number of bits in a byte. For example, if the summation of differences was a "−4", block 1307 would form a byte that had four 1s and four 0s. After the byte is formed in block 1307, control is transferred to block 1308 which loads the formed byte into shift register 1212 and inserts 0s into shift register 1211.

Returning to decision block 1306, if the answer is no, decision block 1309 determines if the summation of differences is greater than zero. If the answer is yes, block 1312 forms a byte which contains the equivalent number of bits equal to the absolute value of the summation of differences. Block 1313 then loads this formed byte into shift register 1211 and inserts 0s into shift register 1212 before transferring control back to decision block 1301. If the answer in decision block 1309 is no, control is transferred to block 1311 which inserts 0s into shift registers 1211 and 1212 before transferring control back to decision block 1301.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

What is claimed is:

1. An apparatus in a switching system for generating a timing signal for transmission to an external system by a central timing unit in synchronism with one of a plurality of external links and the central timing unit synchronous to another timing reference, comprising:

a digital frequency synthesizer;

a switch for switching data between the plurality of external links;

a local timing unit synchronized to the central timing unit via a timing connection communicated through the switch;

the local timing unit under control of the central timing unit selecting timing information from the one of the external links and transmitting the selected timing information via the timing connection to the central timing unit; and the central timing unit responsive to the transmitted timing information for controlling the digital synthesizer to generate the timing signal.

2. The apparatus of claim 1 wherein the timing connection comprises a plurality of timing paths; and the local timing unit transmitting the selected timing information on all of the plurality of timing paths.

3. The apparatus of claim 2 wherein the switch comprises a plurality of switching units with each of the plurality of timing paths being communicated by an individual one of the plurality of switching units.

4. The apparatus of claim 3 further comprises a difference detector connected to the local timing unit and connected to the one of the plurality of external links for determining a difference in timing between the one of the plurality of external links and local timing unit;

the local timing unit transmitting the determined timing difference as the selected timing difference to the central timing unit via the timing connection.

5. The apparatus of claim 4 wherein the central timing unit further transmitting timing information on each one of the timing paths; and the local timing unit responsive to timing information received via the plurality of timing paths for synchronizing to the central timing unit.

6. The apparatus of claim 5 wherein the local timing unit further responsive to received timing information for statistically calculating an adjustment to synchronous the local timing unit to central timing unit.

7. The apparatus of claim 6 wherein the local timing unit further discontinuing use of those ones of the plurality of timing paths whose timing information is not similar to the other ones of the plurality of timing paths.

8. The apparatus of claim 7 wherein the timing difference detector comprises a circuit for calculating difference in phase between frequency of the connected one of the plurality of external links and the local timing unit at periodic intervals of time; and the circuit further transmitting the calculated difference in phase to the local timing unit.

9. The apparatus of claim 8 wherein the other timing reference is another one of the plurality of external links and the local timing unit under control of the central timing unit selecting other timing information from the other one of the external links and transmitting the selected other timing information via the timing connection to the central timing unit; and the central timing unit responsive to the transmitted other timing information for adjusting timing of central timing unit.

10. The apparatus of claim 9 further comprises another difference detector connected to the local timing unit and connected to the other one of the plurality of external links for determining another difference in timing between the other one of the plurality of external links and local timing unit;

the local timing unit transmitting the determined other timing difference as the selected other timing difference to the central timing unit via the timing connection.

11. The apparatus of claim 10 wherein the digital synthesizer comprises a first circuit for receiving digital timing pulses from the central timing unit; and a second circuit for generating the timing signal by inhibiting ones of the received digital timing pulses from being included in the generated timing signal under control of the central timing unit.

12. The apparatus of claim 11 further comprises an analog circuit responsive to the generated timing signal for producing an analog signal.

13. A method in a switching system for generating a timing signal for transmission to an external system by a central timing unit in synchronism with one of a plurality of external links and the central timing unit synchronous to another timing reference, comprising the steps of:

switching data between the plurality of external links by a switch;

synchronizing a local timing unit to the central timing unit via a timing connection communicated through the switch;

selecting timing information from the one of the external links and transmitting the selected timing information via the timing connection to the central timing unit by the local timing unit under control of the central timing unit; and controlling by the central timing unit in response to the transmitted timing information a digital synthesizer to generate the timing signal.

14. The method of claim 13 wherein the timing connection comprises a plurality of timing paths and the method further comprises the step of transmitting the selected timing information on all of the plurality of timing paths.

15. The method of claim 14 wherein the switch comprises a plurality of switching units with each of the plurality of timing paths being communicated by an individual one of the plurality of switching units.

16. The method of claim 15 further comprises the step of determining a difference in timing between the one of the plurality of external links and local timing unit by a difference detector connected to the local timing unit and connected to the one of the plurality of external links.

17. The method of claim 16 wherein timing information is transmitted on each one of the timing paths.

18. The method of claim 17 further comprises the step of statistically calculating an adjustment to synchronous the local timing unit to central timing unit by the local timing unit further in response to received timing information.

19. The method of claim 18 further comprises the step of discontinuing by the local timing unit use of those ones of the plurality of timing paths whose timing information is not similar to the other ones of the plurality of timing paths.

20. The method of claim 19 wherein the timing difference detector comprises a circuit and the method further comprises the steps of calculating by the circuit the difference in phase between frequency of the connected one of the plurality of external links and the local timing unit at periodic intervals of time; and transmitting by the circuit the calculated difference in phase to the local timing unit.

21. The method of claim 20 wherein the other timing reference is another one of the plurality of external links and the method further comprises the steps of selecting other timing information from the other one of the external links and transmitting the selected other timing information via the timing connection to the central timing unit by the local timing unit under control of the central timing unit; and adjusting timing of central timing unit by the central timing unit in response to the transmitted other timing information.

22. The method of claim 21 further comprises another difference detector connected to the local timing unit and connected to the other one of the plurality of external links and the method further comprises the steps of determining another difference in timing between the other one of the plurality of external links and local timing unit by the other difference detector and;

transmitting by the local timing unit the determined other timing difference as the selected other timing difference to the central timing unit via the timing connection.

23. The method of claim 22 further comprises the steps of receiving digital timing pulses from the central timing unit by a first circuit in the digital synthesizer; and generating the timing signal by a second circuit in digital synthesizer by inhibiting ones of the received digital timing pulses from being included in the generated timing signal under control of the central timing unit.

24. The method of claim 23 further comprises the step of producing an analog signal by an analog circuit in digital synthesizer in response to the generated timing signal.

\* \* \* \* \*